United States Patent [19]

Strauss

[11] Patent Number: 4,497,749
[45] Date of Patent: Feb. 5, 1985

[54] CHECK VALVE FOR AMMONIA INJECTOR APPARATUS

[75] Inventor: Theodore R. Strauss, Wayne, N.J.

[73] Assignee: Pennwalt Corporation, Philadelphia, Pa.

[21] Appl. No.: 556,802

[22] Filed: Dec. 1, 1983

[51] Int. Cl.³ .................... C02F 1/50; F16K 15/14
[52] U.S. Cl. .................... 261/64 B; 261/62; 261/121 R; 261/124; 137/512.1; 137/512.15; 137/605; 137/860; 210/764; 210/136; 210/143; 210/220
[58] Field of Search ............ 137/112, 113, 512.15, 137/516.15, 860, 512.1; 210/764, 100, 101, 136, 137, 143, 220; 261/64 B, 121 R, 62, 124

[56] References Cited

U.S. PATENT DOCUMENTS

| | | | |
|---|---|---|---|
| 2,742,764 | 4/1956 | Clair | 137/113 |
| 2,757,685 | 8/1956 | Fritsch | 137/860 |
| 2,768,951 | 10/1956 | Fehlman | 210/101 |
| 2,791,230 | 5/1957 | Schaschl | 137/112 |
| 3,129,784 | 4/1964 | Smallpeice | 137/860 |
| 3,151,623 | 10/1964 | Riordan | 137/112 |
| 3,154,486 | 10/1964 | Weaver | 137/860 |
| 3,363,644 | 1/1968 | Malec | 137/860 |
| 3,398,689 | 8/1968 | Allington | 210/101 |
| 3,451,422 | 6/1969 | Chorkey | 137/112 |
| 3,493,270 | 2/1970 | Doerfler | 137/860 |
| 3,511,271 | 5/1970 | Pollinger | 137/860 |
| 3,604,445 | 9/1971 | Jordan | 137/113 |
| 3,606,907 | 9/1971 | Stenberg | 137/112 |
| 3,779,268 | 12/1973 | Conkling | 137/113 |
| 3,802,012 | 4/1974 | Middleton | 137/860 |
| 3,890,995 | 6/1975 | Miller | 137/113 |
| 4,072,161 | 2/1978 | Schoeneweis | 137/860 |
| 4,095,617 | 6/1978 | Hodgson | 137/860 |
| 4,202,180 | 5/1980 | Cox | 137/113 |
| 4,214,607 | 7/1980 | Bouteille | 137/860 |

FOREIGN PATENT DOCUMENTS 2041075 9/1980 United Kingdom ............ 210/137

Primary Examiner—Ernest G. Therkorn

[57] ABSTRACT

Apparatus for injecting ammonia into water, or more particularly, into hard water. Apparatus includes a check valve having a plurality of spaced recessed annuli therearound communicating with an axially disposed bore through orifices or ports interconnecting the bore with the annuli. Annuli profile is characterized by sharp right angle edges defining the outer and inner diameters with no tapered O-ring seat portions therebetween. O-rings are fitted around the annuli in pressure sealing relationship and make line contact only with the outer sharp edges or diameters of the annuli, thus providing a faster responding and more sensitive valve to minor adjustments in ammonia pressure than check valves with tapered seats for the O-rings as well as being devoid of tapered surfaces upon which hard insoluble calcium deposits or scale tend to form when ammonia is added to water.

1 Claim, 4 Drawing Figures

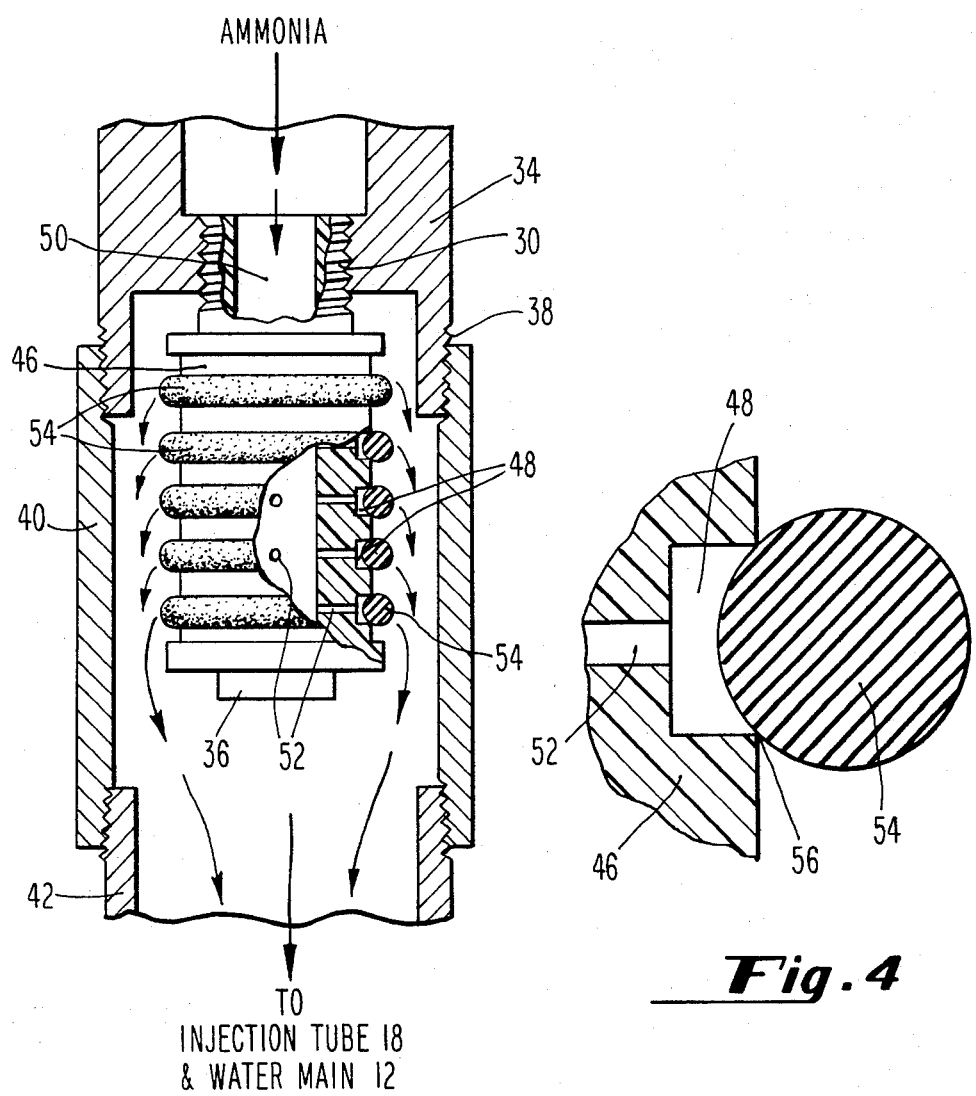

CHECK VALVE FOR AMMONIA INJECTOR APPARATUS

STATEMENT OF THE INVENTION

The present invention relates to apparatus for the injection of ammonia into potable water and wastewater for the disinfection and treatment thereof respectively, and more particularly to an improved check valve for use with the apparatus.

BACKGROUND AND SUMMARY OF THE INVENTION

Many sewage and water treatment facilities in the past adopted the chlorine-ammonia treatment for disinfecting and destroying harmful micro-organisms in the water since the combination of chlorine and ammonia produced a more stable disinfecting residual than that produced by chlorine alone. The chlorine-ammonia treatment however, declined in popularity in the past several decades due to the emergence of "free residual" chlorination processes and to the superior bactericidal efficiency of hypochlorous acid. Currently, ammonia is being widely used as treatment for potable water effluents due to its ability to react with hypochlorous acid (formed when chlorine is added to water) to form chloramines which are not harmful or carcinogenic to humans in small amounts, and like hypochlorous acid, retains the oxidizing power of the chlorine.

Ammonia may be injected into water to be treated by ammoniators. The feeding of ammonia into water, particularly potable hard water, for example, having high concentrations of calcium, flowing under pressure in a pipe or water main, creates problems which are substantially overcome by the apparatus of the present invention.

More specifically, ammonia is highly soluble in water. During normal feeding of ammonia thereinto, the ammonia is readily absorbed by the water flowing past the ammonia discharge point. When the ammonia feed is discontinued, rapid absorption of the ammonia remaining in the feed lines causes the water to be drawn back thereinto with resultant flooding of the apparatus.

While backflows can ordinarily be prevented by a properly disposed check valve, another problem arises from the formation of calcium carbonate which precipitates from solution when ammonia is absorbed by hard water. Calcium carbonate is a hard insoluble scale material which will build up on any structure immersed in the water, thereby causing plugging and clogging of feed lines and failure or malfunctioning of the check valve. Frequent scale removal thus becomes necessary if proper equipment operation is to be maintained. Since components disposed or mounted within the feed pipe must be removed for descaling, any scale build-up in the feed pipe itself makes withdrawal of these components therefrom more difficult.

In the present invention, the ammonia injection tube is mounted vertically so that the ammonia is discharged downwardly into the water main. The improved check valve is mounted in a vertically disposed portion of an ammonia feed supply pipe well above the water main such that water does not frequently contact the check valve during normal operation, and hence scale build-up thereon is minimized. On shut-down, even though the ammonia in the feed lines dissolves in the water to draw it into the tube, the resultant ammonia-water solution is effectively isolated from the main water stream to further minimize scale formation on the valve. But regardless of the measures taken to prevent scale build-up on the valve and in the feed lines, some water will come in contact with the valve to form a scale thereon, notwithstanding the valve will preferably be made of polytetrafluoroethylene which discourages adhesion of scales thereon and optional air-purging of the the feed lines upon ammonia shut-down, later described.

The improved check valve of the present invention employs elastomeric O-rings, as do some other known check valves, for sealing off radial ports provided in the valve body when pressures therewithin are too low to sufficiently expand the O-rings from their sealing relationship. The valve body however is provided with an unique seating arrangement for the O-rings which positively prevents scale from forming on the valve at those portions thereof where descaling is considered necessary, regardless of the hardness of the water being treated. The unique seating arrangement also provides a more sensitive and faster responding valve, is easier to fabricate or mold since no tapered valve seats are required, and permits ammonia to be discharged from the valve in discrete form, such as bubbles, rather than in less discrete form, thus enabling a greater surface area of the ammonia to contact the water for more efficient treatment thereof.

BRIEF DESCRIPTION OF THE DRAWINGS

FIG. 3 is a view, partially sectioned, partially in perspective, and partially cut-away, of a portion of the apparatus illustrated in FIG. 1, showing the check valve in an operational environment.

FIG. 4 is an enlarged fragmentary sectional view of the check valve shown in FIGS. 2 and 3.

DETAILED DESCRIPTION OF THE INVENTION

Figure 1:
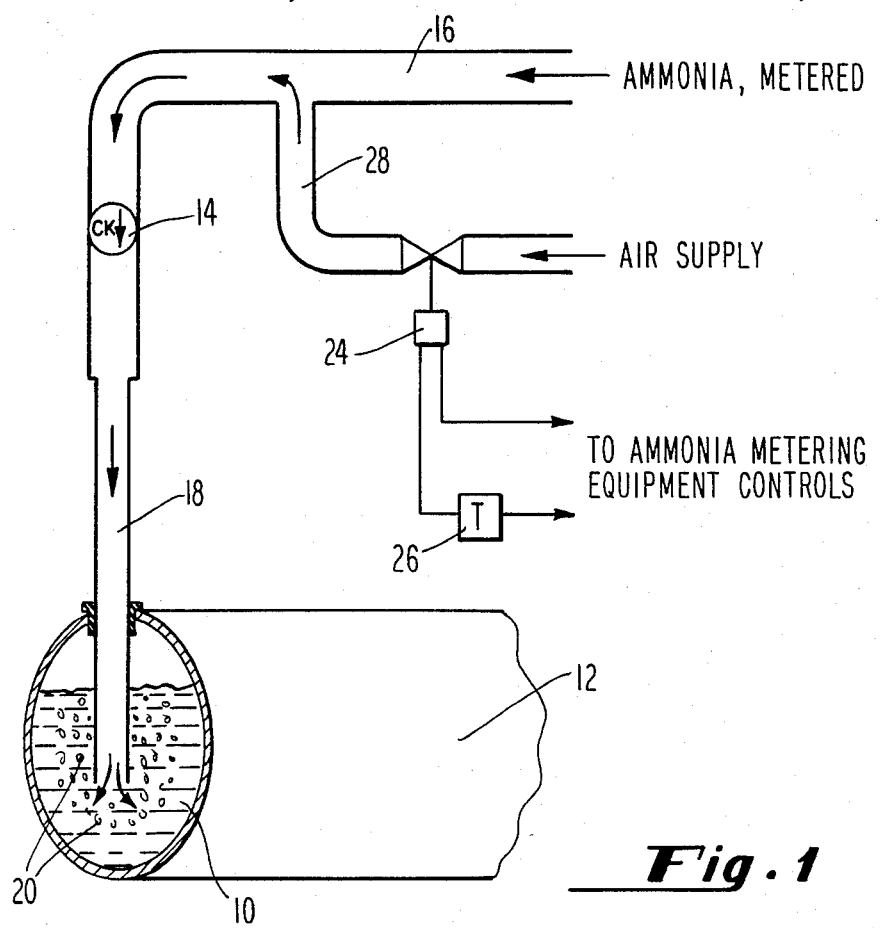
FIG. 1 is a partially sectioned, schematic diagram of ammonia injection apparatus employing the check valve of the present invention.

Ammonia injector apparatus is schematically illustrated in FIG. 1 wherein potable water 10 having a high concentration of calcium is flowing under pressure through a water main 12. Metered anhydrous ammonia, under pressure, is caused to pass through check valve 14, mounted in ammonia supply pipe 16, and into injection tube 18, prior to discharge into water 10.

Injection tube 18, preferably of polytetrafluoroethylene, is mounted vertically, with check valve 14 located thereabove in a vertically disposed portion of supply pipe 16 through which ammonia is fed downwardly past the injection tube and into water main 12 through a suitable sealed opening therein. Typically, check valve 14 will be disposed several feet above the level of water 10. The discharge of ammonia into water 10 causes bubbles 20 of ammonia to rise therein.

Under extreme water hardness conditions, optional means are provided for purging injection tube 18 with air during the period immediately following shut-down to further minimize scale formation on check valve 14.

Thus, when purging is effected by automatic means, shut-down of the ammonia metering equipment causes an electric signal to be generated which opens solenoid valve 24 and starts timer 26. Opening solenoid valve 24 permits a predetermined amount of pressurized air to immediately flow into air supply feed pipe 28 which feeds into ammonia supply pipe 16 and through check valve 14 to thereby minimize water back-up into injection tube 18.

Purge air may, of course, be effected manually, or a small amount of air may be permitted to flow continuously through check valve 14 until ammonia feeding is resumed.

Figure 2:
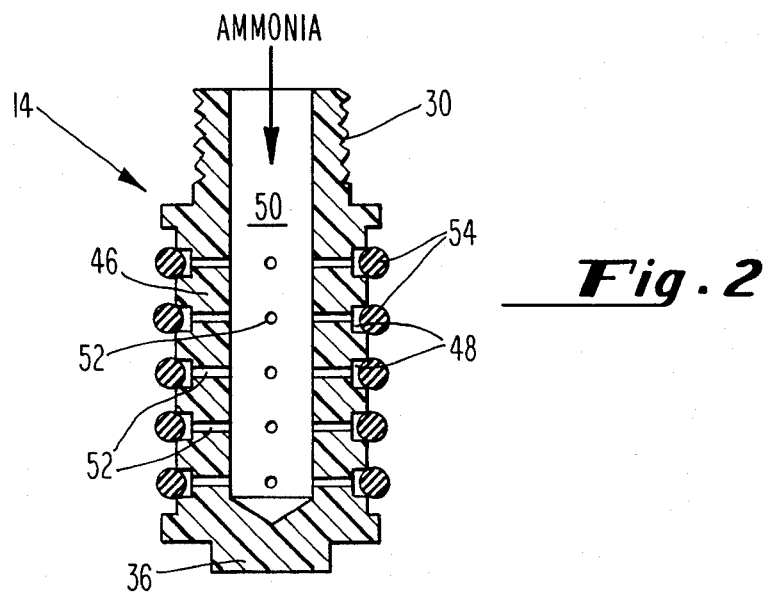
FIG. 2 is a longitudinal sectional view of the check valve of the present invention.

It is appreciated that the abovedescribed optional air purge apparatus is used only under extreme water hardness conditions, as aforementioned, since the expense, maintenance and labor involved is not considered to offset the trouble and expense of periodically descaling the injection tube and check valve, especially in view of the improved check valve 14 shown clearly in FIGS. 2 and 3.

Check valve 14, suitably of polytetrafluoroethylene, is approximately 2 inches long and includes an exteriorly threaded portion 30 at its open, fluid-receiving end, or upper end for receiving an hexagonal bushing member 34 which is threadedly attachable to the ammonia supply pipe 16 (not shown in FIGS. 2 and 3) and a boss 36 for engagement with a suitable wrench or tool for easy removal of the check valve or its placement, or replacing, into the apparatus.

Bushing 34 is interiorly threaded to receive threads 30 of check valve 14 and is exteriorly threaded at 38 for reception by a coupling 40 which substantially embraces the check valve (FIG. 3). Coupling 40 accepts an hexagonal, pipe-reducing bushing 42 which threadedly receives the injection tube 18. Bushings 34 and 42, and coupling 40 are preferably made of stainless steel.

Intermediate the threaded portion 30 and boss 36 of check valve 14 is a body portion 46 having a plurality of spaced recessed annuli 48 therearound. An axial bore 50 is provided in check valve 14 which starts from threaded portion 30 and extends slightly below the lowermost annulus 48 but short of boss 36. Each of the recessed annuli 48 communicates with bore 50 by means of a plurality of spaced passageways, orifices, or ports 52 connected therebetween. More specifically, five annuli 48 are shown in the drawings and each annulus is associated with four ports 52 spaced 90° apart. The valve, of course, is not intended to be limited to these specific quantities.

An O-ring 54 is sealingly disposed around each annulus 48 to prevent ammonia from passing through ports 52 until a predetermined positive pressure is reached within bore 50.

Unlike other check valves however, which are provided with seats for the O-rings which are purposefully tapered, the present check valve requires O-rings 54 to effect line contact only with sharp edges 56 (FIG. 4) defining the profiles of annuli 48. Thus, compared with check valves having tapered seats for O-rings, the present valve is devoid of a tapered area upon which scales tend to form, is more responsive to minor pressure adjustments in the ammonia metering apparatus, and discharges ammonia gas in a more discrete mode.

In operation, when pressure within bore 50 is sufficient to overcome the resistance of O-rings 54, bubbles of ammonia will be discharged through ports 52. Bubbles present a larger surface area than an equivalent volume in less discrete form, and hence, a more efficient biocidal action is expected to result. Since the O-rings are making line contact only with sharp edges 56 of annuli 48, any additional slight increase in ammonia pressure within supply pipe 16 will cause more bubbles to be discharged through ports 52 into injection tube 18 and water 10. Since there is no tapered surface upon which the scale can build, the necessity of descaling the check valve is non-existent.

It was expected that scale would accumulate within annuli 48 and/or ports 52 with the present line contact seating arrangement between the O-rings and annuli. Quite unexpectedly, however, the present ammoniator apparatus was operated over extended periods with no build-up of scale.

Upon shut-down or sufficient lowering of ammonia pressure, O-rings 54 contract to effect complete line contact with annuli 48 to thereby prevent or check the ammonia-water solution from backing up into the apparatus. As aforementioned, optional air purge apparatus is available for further minimizing solution back-up.

I claim:

1. Injection apparatus for injecting gas under pressure into water flowing in a conduit, said apparatus including pipe means for transporting said pressurized gas into said water, a check valve mounted within said pipe means above said conduit, said check valve comprising a cylindrical body portion having a plurality of spaced recessed annuli in circumscribed relationship therearound, an axially disposed bore in said body communicating with said gas transported within said pipe means, said bore extending downwardly from an upper portion of said body to a lower portion where lowermost of said annuli circumscribes said body, a plurality of spaced ports disposed in said body communicating between said bore and each of said annuli, each of said annuli characterized by sharp right angle edges defining its outermost and innermost diameter and being devoid of taper therebetween, an O-ring disposed around each of said annuli in pressure sealing relationship, each of said O-rings effecting line contact only with said outermost sharp edges of each of said annuli, each of said O-rings having a thickness diameter slightly greater than width of said recessed annuli, whereby said pressurized gas stretches said O-rings to place them in tension to permit passage of said pressurized gas at points along said line contact between said O-rings and recessed annuli, means to shut-down flow of gas in said pipe means, and other means for automatically feeding pressurized purge air into said pipe means upstream of said check valve upon said shut-down.

* * * * *